(12) United States Patent
Jung et al.

(10) Patent No.: US 11,942,659 B2
(45) Date of Patent: Mar. 26, 2024

(54) BATTERY MODULE AND BATTERY PACK INCLUDING THE SAME

(71) Applicant: LG Energy Solution, LTD., Seoul (KR)

(72) Inventors: Seyun Jung, Daejeon (KR); Jong Ryeol Oh, Daejeon (KR); Dahoon Kang, Daejeon (KR); Gue Tae Cho, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 11 days.

(21) Appl. No.: 17/683,094

(22) Filed: Feb. 28, 2022

(65) Prior Publication Data

US 2022/0285792 A1    Sep. 8, 2022

(30) Foreign Application Priority Data

Mar. 4, 2021   (KR) .................. 10-2021-0029073
Jan. 6, 2022   (KR) .................. 10-2022-0002296

(51) Int. Cl.
| | |
|---|---|
| *H01M 50/507* | (2021.01) |
| *H01M 10/04* | (2006.01) |
| *H01M 10/613* | (2014.01) |
| *H01M 10/653* | (2014.01) |
| *H01M 50/211* | (2021.01) |
| *H01M 50/533* | (2021.01) |
| *H01M 50/543* | (2021.01) |

(52) U.S. Cl.
CPC ..... *H01M 50/507* (2021.01); *H01M 10/0486* (2013.01); *H01M 10/613* (2015.04); *H01M 10/653* (2015.04); *H01M 50/211* (2021.01); *H01M 50/533* (2021.01); *H01M 50/543* (2021.01); *H01M 2220/20* (2013.01)

(58) Field of Classification Search
CPC ............. H01M 50/507; H01M 50/533; H01M 50/211; H01M 50/543; H01M 10/613; H01M 10/653; H01M 10/0486
See application file for complete search history.

(56) References Cited

U.S. PATENT DOCUMENTS

2021/0344074 A1    11/2021   Jung et al.

FOREIGN PATENT DOCUMENTS

| EP | 3796462 A1 | 3/2021 | |
|---|---|---|---|
| JP | 2005-071674 A | 3/2005 | |
| KR | 10-2020-0099106 A | 8/2020 | |
| KR | 10-2020-0104143 A | 9/2020 | |
| KR | 10-2020-0109727 A | 9/2020 | |
| WO | WO-2020175881 A1 * | 9/2020 | ........ H01M 10/0486 |
| WO | WO-2020251159 A1 * | 12/2020 | ........ H01M 10/647 |

\* cited by examiner

*Primary Examiner* — Karie O'Neill Apicella
(74) *Attorney, Agent, or Firm* — Bryan Cave Leighton Paisner LLP (57) ABSTRACT

A battery module including a battery cell stack, which includes a plurality of battery cells stacked in a stacking direction, a housing for the battery cell stack, a busbar that is connected with the electrode lead of the battery cell, a busbar frame that faces the front surface or rear surface of the battery cell stack and has the busbar mounted on a surface thereof, an end plate that is coupled with the housing and covers the busbar frame, and a cooling member that is located in a separation space between the busbar frame and the end plate. The cooling member includes a thermal conductive resin.

10 Claims, 8 Drawing Sheets

BATTERY MODULE AND BATTERY PACK INCLUDING THE SAME

CROSS-REFERENCE TO RELATED APPLICATIONS

This application claims priority pursuant to 35 U.S.C. § 119(a) to Korean Patent Application No. 10-2021-0029073 filed on Mar. 4, 2021, and Korean Patent Application No. 10-2022-0002296 filed on Jan. 6, 2022, the contents of which are incorporated as if fully set forth herein.

FIELD

The present disclosure relates to a battery module and a battery pack including the same, and more particularly, to a battery module having enhanced safety and a battery pack including the same.

BACKGROUND

Along with increasing developments in technology and demands for mobile devices, the demand for batteries as energy sources is rapidly increasing. In particular, a secondary battery attracts considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

When secondary batteries are mainly used for devices such as mobile devices, there is no difficulty in achieving the storage capacity and energy output level required by each device even if one or two to four battery cells are used. However, the medium- or large-sized devices such as automobiles require high-output and large-capacity storage devices, and therefore, when a small number of battery cells are used as described above, big problems can arise in terms of energy storage capacity and energy output. Therefore, in the medium- or large-sized device, it is common to mount a battery module for electrically connecting a plurality of battery cells, or a battery pack including a plurality of such battery modules.

Figure 1:
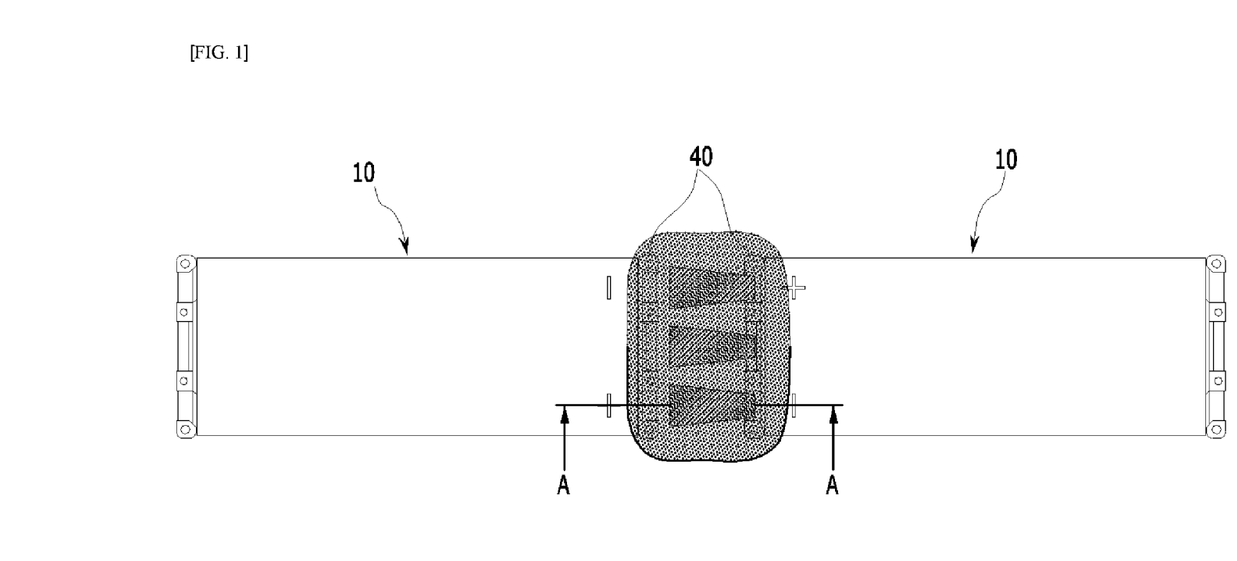
FIG. 1 is an illustration of a conventional battery pack to which a battery module is mounted when the battery module is ignited.
Figure 2:
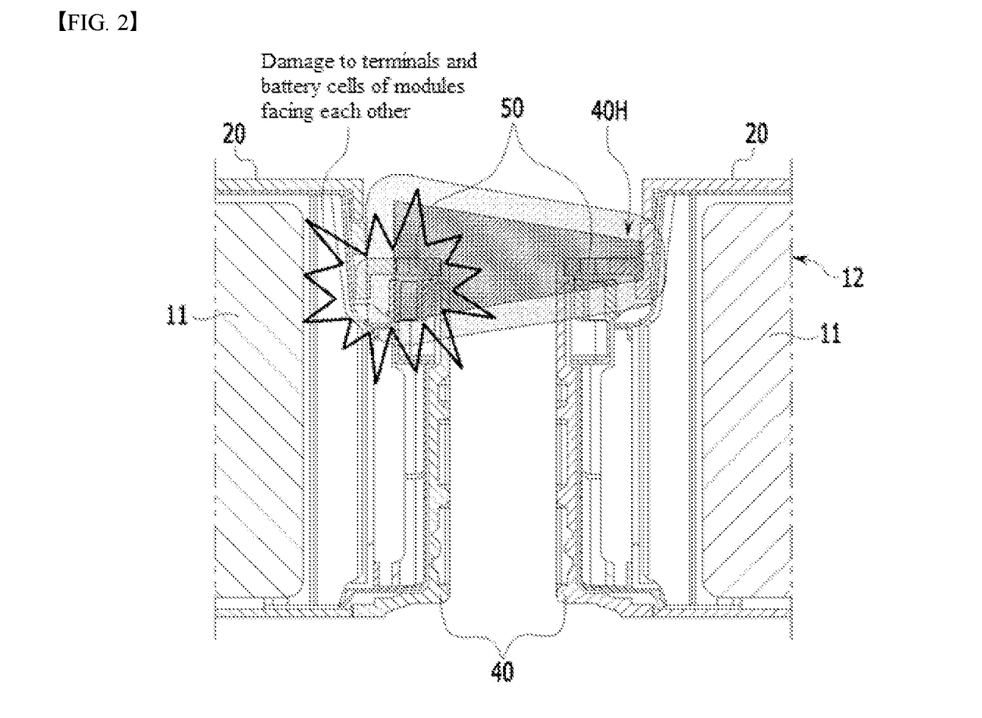
FIG. 2 is a cross-sectional view along the line A-A' of FIG. 1 showing a flame affecting an adjacent battery module when the conventional battery module ignites.
Figure 3:
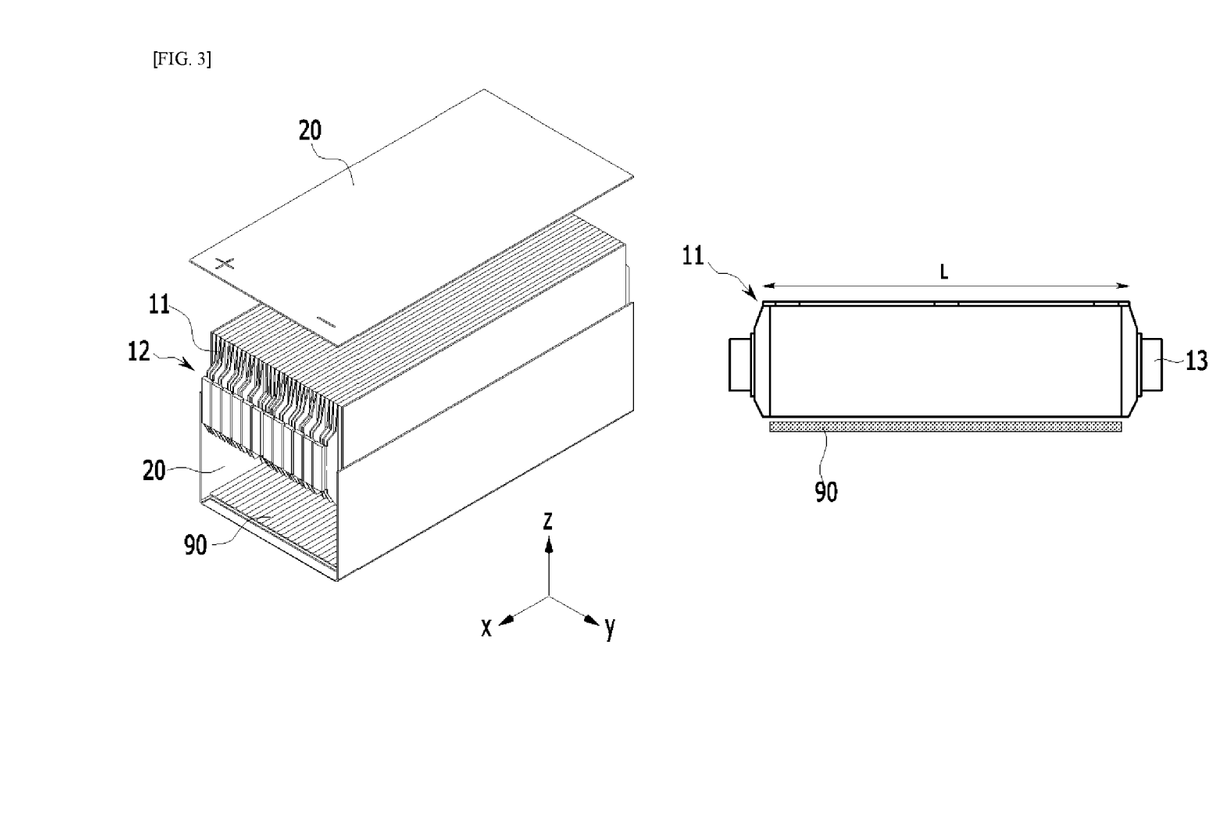
FIG. 3 is an illustration of a thermal conductive resin layer included in a conventional battery module.

FIG. 1 is an illustration of a configuration at the time of ignition of a conventional battery pack in which a battery module is mounted. FIG. 2 is a cross-sectional view along the line I-I' of FIG. 1 showing the appearance of a flame that affects adjacent battery modules during ignition of the conventional battery module. FIG. 3 is an illustration explaining a thermal conductive resin layer included in a conventional battery module.

As illustrated in FIGS. 1 and 2, the conventional battery module 10 includes a battery cell stack 12 in which a plurality of battery cells 11 are stacked, a housing 20 for protecting the battery cell stack 12 from external impact, heat or vibration, and end plates 40 for covering the front surface and/or the rear surface of the battery cell stack 12.

The battery module 10 has a closed structure through the coupling of the housing 20 and the end plate 40, but the end plate 40 may be formed with an opening 40H for connecting an inner member and an outer member of the battery module 10.

In the battery module 10, the internal pressure of the battery cell 11 may increase due to overcharging or the like, and high-temperature heat, gas, or flame is discharged to the outside of the battery cells 11, whereby a continuous ignition phenomenon between the battery cells 11 may occur. Moreover, the heat, gas or the like in the battery module 10 may be discharged through the opening 40H. In the battery pack, since the plurality of battery modules 10 are mainly arranged so that the end plates 40 face each other, the heat, gas or the like discharged through the opening 40H may propagate heat to an adjacent battery module 10 (thermal propagation) and induce an ignition phenomenon of the adjacent battery module 10.

Since the above-mentioned ignition phenomenon reduces the durability and safety of the battery module 10, a thermal conductive resin layer 90 is provided in the conventional battery module 10 as illustrated in FIG. 3. The thermal conductive resin layer 90 is located between the bottom part (lower surface) of the housing 20 and the battery cell stack 12, and transfers the heat generated by the battery cell stack 12 to the bottom part of the housing 20. As the thermal conductive resin layer 90 discharges the heat inside the battery module 10 to the outside, the temperature inside the battery module 10 can be prevented from rising and the ignition phenomenon inside the battery module 10 can be slightly alleviated.

Meanwhile, a busbar 50 or a module connector (not shown) may be located in the opening 40H. As the busbar 50 is coupled to electrode leads 13 located at both ends of the battery cell 11, it is electrically connected to a plurality of battery cells 11 and is electrically connected to the busbar 50 of the adjacent battery module 10 through the opening 40H. Thereby, the busbar 50 may easily generate heat due to high voltage/high current. Further, since the busbar 50 is located in the opening 40H where heat/pressure inside the battery module 10 is concentrated, the busbar 50 and the peripheral portion of the busbar 50 may be easily subjected to a high temperature/high pressure environment.

The conventional battery module 10 is not provided with a separate cooling member for the busbar 50 and its peripheral portion. Further, since the thermal conductive resin layer 90 is mainly formed on one surface of the housing 20, it is also difficult to provide a cooling path for the electrode leads 13 protruding from both ends of the housing 20 and the busbar 50 connected thereto. For this reason, the heat generated from the peripheral portion of the busbar 50 or transferred to the peripheral portion of the busbar 50 could promote the ignition phenomenon of the battery cell 11 by being transferred to the electrode lead 13 and/or the battery cell 11, or could increase the internal temperature of the battery module 10 by moving along a sporadic path such as being transferred to the bottom surface of the thermal conductive resin layer 90 or the housing 20 through the battery cell 11.

Therefore, in order to improve the durability and safety of the battery module 10, there is a need to develop a battery module 10 that prevents an internal temperature rise and an ignition phenomenon by providing a heat transfer passage around the busbar 50.

SUMMARY

It is an objective of the present disclosure to provide a battery module having improved durability and safety by minimizing the temperature rise in the electrical module and the ignition phenomenon resulting therefrom, and a battery pack including the same.

However, the problem to be solved by embodiments of the present disclosure is not limited to the above-described problems, and can be variously expanded within the scope of the technical idea included in the present disclosure.

According to one exemplary embodiment of the present disclosure, there is provided a battery module comprising: a battery cell stack in which a plurality of battery cells are stacked in one direction, a housing that houses the battery cell stack, a busbar that is connected with the electrode lead of the battery cell, a busbar frame that faces the front surface or rear surface of the battery cell stack and mounts the busbar on one surface, an end plate that is coupled with the housing and covers the busbar frame, and a cooling member that is located in a separation space between the busbar frame and the end plate, wherein the cooling member is formed of a thermal conductive resin.

The cooling member may come into contact with the busbar and the end plate.

The cooling member may be formed long along a stacking direction of the plurality of battery cells.

The cooling member may be located closer to the bottom of the housing than to the top of the housing.

The cooling member may have an insulating property.

The battery module may further comprise a thermal conductive resin layer located on the bottom part of the housing, wherein heat generated from the busbar is transferred to the thermal conductive resin layer.

The end plate may be formed of a thermal conductive material.

The battery module may further comprise a partition wall located between the end plate and the busbar frame and protruding from one surface of the end plate or the busbar frame.

The partition wall may be located closer to the bottom of the housing than to the top of the housing.

According to one exemplary embodiment of the present disclosure, there is provided a battery pack comprising the battery module.

According to exemplary embodiments, the battery module of the present disclosure can form a cooling member capable of directly cooling the heat around the busbar, thereby improving the cooling effect of the busbar and the electrode lead themselves.

The effects of the present disclosure are not limited to the effects mentioned above and additional other effects not described above will be clearly understood from the description of the appended claims by those skilled in the art.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Now, a battery module according to one exemplary embodiment of the present disclosure will be described.

Figure 4:
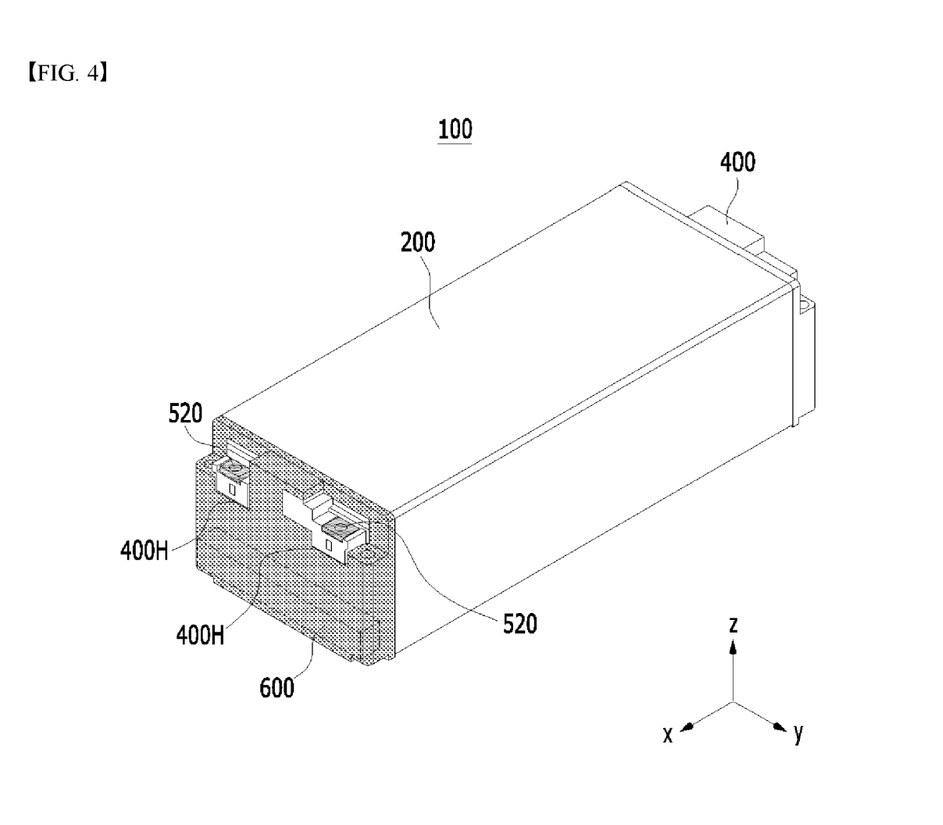
FIG. 4 is a perspective view of a battery module according to an exemplary embodiment of the present disclosure.
Figure 5:
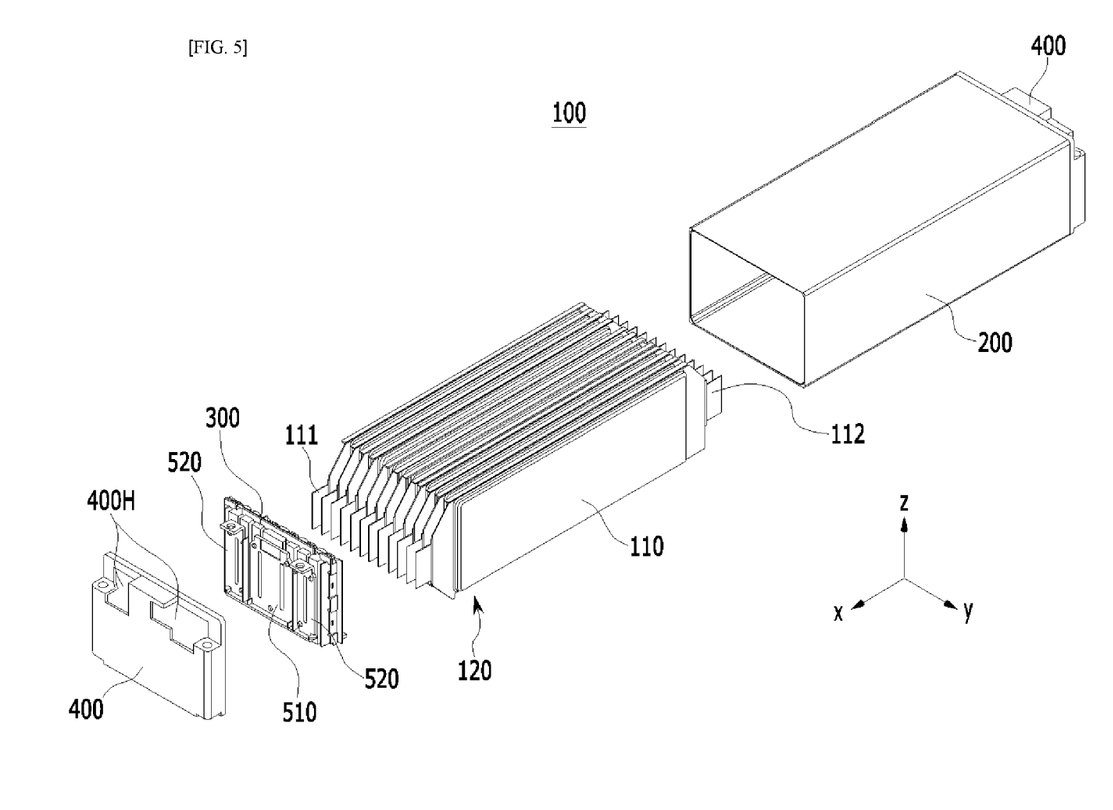
FIG. 5 is an exploded perspective view of the battery module of FIG. 4.
Figure 6:
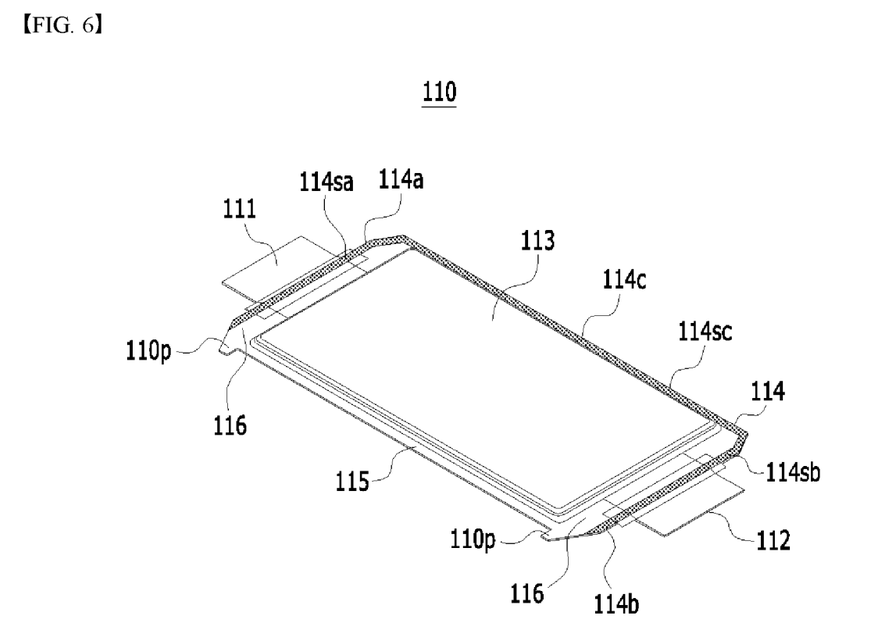
FIG. 6 is an illustration of a battery cell included in the battery module of FIG. 4.

FIG. 4 is a perspective view of a battery module according to an exemplary embodiment of the present disclosure. FIG. 5 is an exploded perspective view of the battery module of FIG. 4. FIG. 6 is an illustration of a battery cell included in the battery module of FIG. 4.

As illustrated in FIGS. 4 and 5, the battery module 100 according to one exemplary embodiment of the present disclosure may comprise a battery cell stack 120 in which a plurality of battery cells 110 are stacked in one direction, a housing 200 that houses the battery cell stack 120, a busbar frame 300 that is located on the front and/or rear surface of the battery cell stack 120, end plates 400 that cover the front and/or rear surface of the battery cell stack 120, and busbars 510 and 520 that are mounted on the busbar frame 300.

The battery cells 110 may be provided in a pouch shape that can maximize the number of stacked cells per unit area. The battery cell 110 provided in the pouch shape can be manufactured by housing an electrode assembly including a positive electrode, a negative electrode, and a separator in a cell case 114 of a laminate sheet and then heat-sealing the sealing part of the cell case 114. However, it will be obvious that the battery cell 110 need not be essentially provided in a pouch shape, and can be provided in a square, cylindrical, or various other forms, at a level where the storage capacity required by the device to be mounted in the future is achieved.

As illustrated in FIG. 6, the battery cell 110 may include two electrode leads 111 and 112. The electrode leads 111 and 112 may have a structure protruding from opposite ends of the cell body 113, respectively. Specifically, one end of each of electrode leads 111 and 112 is located inside the battery cell 110 and thus is electrically connected to the positive electrode or negative electrode of the electrode assembly, respectively. The other end of the respective electrode leads 111 and 112 protrudes to the outside of the battery cell 110, specifically the cell body 113, and thus can be electrically connected with a separate member, for example, the busbars 510 and 520.

The electrode assembly in the cell case 114 can be sealed by the sealing parts 114sa, 114sb and 114sc. The sealing parts 114sa, 114sb and 114sc of the cell case 114 may be located on both end parts 114a and 114b and one side part 114c connecting them.

The cell case 114 is generally formed of a laminate structure of a resin layer/metallic thin film layer/resin layer. For example, a surface of the cell case formed of an O (oriented)-nylon layer tends to slide easily by an external impact when a plurality of battery cells are stacked to form a medium- or large-sized battery module. Therefore, an adhesive member, for example, a sticky adhesive such as a double-sided tape or a chemical adhesive coupled by a chemical reaction upon adhesion, can be adhered to the surface of the battery case 114 to form a battery cell stack 120 and prevent this sliding and maintain a stable stacking structure of the battery cells 110.

The connection part 115 may refer to a region extending along the longitudinal direction at one end of the cell case 114 in which the above-mentioned sealing parts 114sa, 114sb and 114sc are not located. A protruding part 110p of the battery cell 110 called a bat-ear may be formed at an end part of the connection part 115. Further, the terrace part 116 may refer to a region between electrode leads 111 and 112 and a part thereof protrudes to the outside of the cell case 114, and the cell body 113 located inside the cell case 114, on the basis of the edge of the cell case 114.

The battery cell stack 120 may be one in which a plurality of electrically connected battery cells 110 are stacked in one direction. A direction in which the plurality of battery cells 110 are stacked (hereinafter referred to as a 'stacking direction') may be a y-axis direction as shown in FIGS. 4 and 5 (or it may be a y-axis direction, and in the following, the expression 'axial direction' may be interpreted as including all +/− directions). The battery cell stack 120 can have an overall shape similar to that of a rectangular parallelepiped. Each surface of the battery cell stack 120 can be defined by the stacking direction (y-axis direction).

For example, two surfaces facing each other in the stacking direction among the surfaces of the battery cell stack 120 may be defined as side surfaces of the battery cell stack 120. One surface of each battery cell 110 having a length and a width may be located on a side surface of the battery cell stack 120.

Further, among the surfaces of the battery cell stack 120, surfaces facing each other on the axis perpendicular to the stacking direction may be defined as a front surface/a rear surface or an upper surface/a lower surface. The front surface, rear surface, upper surface or lower surface of the battery cell stack 120 may be a surface extending along the stacking direction of the battery cell stack 120. One surface of a plurality of battery cells 110 may be located side by side on the front surface, rear surface, upper surface and lower surface of the battery cell stack 120.

A direction in which the battery cell stack 120 heads from the front surface to the rear surface, or a backward direction thereof may be defined as the longitudinal direction of the battery cell stack 120, which may be an x-axis direction. Further, a direction in which the battery cell stack 120 heads from the upper surface to the lower surface, or a backward direction thereof may be defined as the width direction of the battery cell stack 120, which may be a z-axis direction.

The longitudinal direction of the battery cell stack 120 may be substantially the same as the longitudinal direction of the battery cells 110. The electrode leads 111 and 112 of the battery cells 110 may be located on the front surface and rear surface of the battery cell stack 120. As illustrated in FIG. 5, when the electrode leads 111 and 112 of each battery cell 110 are concentrated on the front surface and rear surface of the battery cell stack 120, the busbars 510 and 520 of the battery module 100 may be designed to be located close to the front surface and rear surface of the battery cell stack 120. Thereby, the busbars 510 and 520 may more easily provide an electrical connection between the electrode leads 111 and 112 located inside the battery module 100 and an electrical member located outside the battery module 100.

The housing 200 may be for protecting the battery cell stack 120 and the electrical components connected thereto from external physical impacts. The housing 200 may be housed in the internal space of the battery cell stack 120 and the electric device housing 200 connected thereto. Here, the housing 200 includes an inner surface and an outer surface, and the inner space of the housing 200 may be defined by the inner surface.

The housing 200 may have various possible structures. In one example, the structure of the housing 200 can be a mono frame. Here, the mono frame may have a metal plate shape in which the upper part, the lower part and both side parts are integrated. The mono frame can be manufactured by extrusion molding. In another example, the structure of the housing 200 may be a U-shaped frame combined with an upper plate. When the U-shaped frame and the upper plate are combined, the structure of the housing 200 may be formed by coupling the upper plate to an upper portion of the side parts of the U-shaped frame, which is a metal plate in which the lower part and both side parts are combined or integrated. Each frame or plate can be manufactured by press molding. Further, the structure of the housing 200 may be an L-shaped frame in addition to the mono frame or the U-shaped frame, and have various other structures not described in the above-mentioned examples.

The structure of the housing 200 may have a shape with two openings, with the two openings being arranged to face each other on the x-axis, which is the longitudinal direction of the battery cell stack 120. The housing 200 may have two surfaces arranged to face each other on the y-axis (hereinafter, referred to as 'surface on the y-axis') and two surfaces arranged to face each other on the z-axis (hereinafter, 'surface on the z-axis').

Here, one surface on the y-axis of the housing 200 may face the side surface of the battery cell stack 120, and may be a surface extending along the width direction or the length direction of the battery cell stack 120. For convenience of explanation, one surface on the y-axis of the housing 200 may be referred to as a side surface of the housing 200. Further, one surface on the z-axis of the housing 200 may face the upper surface or the lower surface of the battery cell stack 120, and may be a surface extending along the stacking direction or the longitudinal direction of the battery cell stack 120. For convenience of explanation, one surface on the z-axis of the housing 200 may be referred to as an upper surface (upper part) or a lower surface (bottom surface or bottom part).

The front surface and rear surface of the battery cell stack 120 may not be hidden by the housing 200. That is, since the length on the x-axis of the housing 200 may be shorter than the length on the x-axis of the battery cell stack 120, at least a portion of the electrode leads 111 and 112 located at both ends of the battery cell 110 may protrude from both ends of the housing 200. The front surface and rear surface of the battery cell stack 120 are not hidden by the housing 200, but it may be hidden by the busbar frame 300, the end plate 400, the busbars 510 and 520, or the like, which will be described later. Thereby, the front surface and rear surface of the battery cell stack 120 may be protected from external physical impacts and the like.

Meanwhile, a compression pad (not shown) may be located between the battery cell stack 120 and the inner surface of the housing 200. The compression pad may be located on a surface on the y-axis of the battery cell stack 120, and may face at least one surface of the two battery cells 110 at both ends of the battery cell stack 120.

Further, a thermal conductive resin may be injected between the battery cell stack 120 and the inner surface of the housing 200, and due to the injected thermal conductive resin, a thermal conductive resin layer 900 (see FIG. 7) may be formed between the battery cell stack 120 and the inner surface of the housing 200. The thermal conductive resin layer 900 may be formed between the battery cell stack 120 and the surface (bottom part) on the z-axis of the housing 200.

The busbar frame 300 can be located on one surface of the battery cell stack 120 to cover one surface of the battery cell stack 120 and, at the same time, guide the connection between the battery cell stack 120 and an external device. The busbar frame 300 may be located on the front surface or rear surface of the battery cell stack 120. At least one of the busbars 510 and 520 and the module connector may be mounted on the busbar frame 300. As illustrated in FIGS. 4 and 5, one surface of the busbar frame 300 is connected with the front surface or rear surface of the battery cell stack 120, and the other surface of the busbar frame 300 may be connected with the busbars 510 and 520.

The busbar frame 300 may include an electrically insulating material. The busbar frame 300 may restrict the busbars 510 and 520 from making contact with other parts of the battery cells 110, except the parts where they are joined to the electrode leads 111 and 112, and may prevent the occurrence of an electrical short circuit.

Although not shown in the drawings, the busbar frame 300 may include a first busbar frame located on the front surface of the battery cell stack 120 and a second busbar frame located on the rear surface of the battery cell stack 120.

The end plate 400 can be for protecting the battery cell stack 120 and electrical equipment connected thereto from external physical impacts by sealing the openings of the housing 200. For this purpose, the end plate 400 may be made of a material having a predetermined strength. For example, the end plate 400 may include a metal such as aluminum.

The end plate 400 may be coupled (joined, sealed or closed) to the housing 200 while covering the busbar frame 300 or the busbars 510 and 520 located on one surface of the battery cell stack 120. Each edge of the end plate 400 may be coupled to a corresponding edge of the housing 200 by a method such as welding.

Further, an insulating cover (not shown) for electrical insulation may be located between the end plate 400 and the busbar frame 300. The insulating cover may be provided in a shape that covers one surface of the end plate 400, but it is not necessarily so.

Although not shown in the drawings, the end plate 400 may include a first end plate located on the front surface of the battery cell stack 120 and a second end plate located on the rear surface of the battery cell stack 120.

The busbars 510 and 520 may be mounted on one surface of the busbar frame 300 and may be for electrically connecting the battery cell stack 120 or the battery cells 110 and an external device circuit. The busbars 510 and 520 are located between the battery cell stack 120 or the busbar frame 300 and the end plate 400, whereby they can be protected from external impacts and the like, and prevent deterioration of durability due to external moisture and the like.

The busbars 510 and 520 can be electrically connected to the battery cell stack 120 through the electrode leads 111 and 112 of the battery cells 110. Specifically, the electrode leads 111 and 112 of the battery cells 110 pass through a slit formed in the busbar frame 300 and then are bent to be connected to the busbars 510 and 520, respectively. The battery cells 110 constituting the battery cell stack 120 may be connected in series or in parallel by the busbars 510 and 520.

The busbars 510 and 520 may include a terminal busbar 520 for electrically connecting one battery module 100 to another battery module 100. At least a portion of the terminal busbar 520 may be exposed to the outside of the end plate 400 to be connected with another external battery module 100, and the end plate 400 may be provided with a terminal busbar opening 400H for this purpose.

The terminal busbar 520 may further include a protruding part that protrudes upward, unlike other bus bars 510, and the protruding part may be exposed to the outside of the battery module 100 via a terminal busbar opening 400H. The terminal busbar 520 may be connected with another battery module 100 or a BDU (Battery Disconnect Unit) via a protruding part exposed through the terminal busbar opening 400H, and may form a high voltage (HV) connection with them.

On the other hand, heat may be easily generated in the busbars 510 and 520 through which high voltage/high current flows, thereby inducing an ignition phenomenon of the battery cell 110 or increasing the temperature of the battery module 100. Further, the heat generated in the busbars 510 and 520 or transferred to the busbars 510 and 520 may be mainly concentrated in a separation space between the busbar frame 300 and the end plate 400, and thus the above-mentioned separation space may become a high temperature/high pressure state. When the above-mentioned separation space becomes a high temperature/high pressure state, the busbars 510 and 520 are heated by themselves as the ambient temperature rises, so that the battery cell 110 may be ignited or the battery module 100 may be heated. Further, the busbar frame 300 or the like may be damaged or the ignition phenomenon within the battery module 100 may be accelerated by the separation space in the high temperature/high pressure state. Moreover, the heat inside the battery module 100 as described above may be discharged to the busbar opening 400H by the high-temperature/high-pressure environment of the separation space, and the discharged heat may cause a continuous ignition phenomenon by propagating heat to an adjacent battery module 100.

To prevent this phenomenon, a thermal conductive resin layer 900 (see FIG. 7) is formed on the conventional battery module 100, but it is not provided in the space where the end plate 400 and the busbar frame 300 are located, and thus, it was insufficient to solve the above-mentioned problems.

Therefore, the battery module 100 according to an exemplary embodiment of the present disclosure is provided with a cooling member for complementing the battery module, and therefore, the cooling member 600 according to an exemplary embodiment of the present disclosure will be described below.

Figure 7:
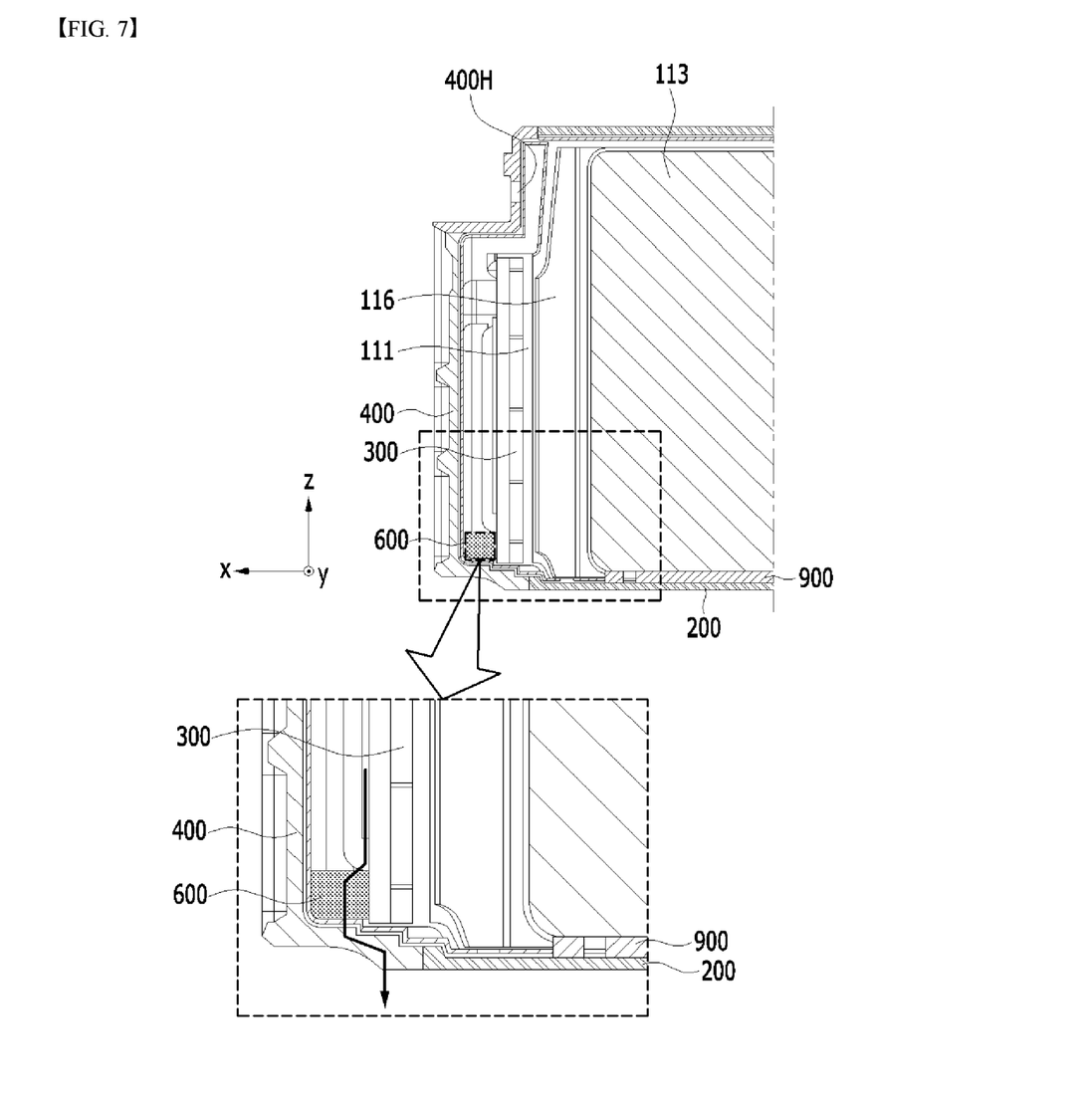
FIG. 7 is a cross-sectional view of the battery module of FIG. 4.

FIG. 7 is a cross-sectional view of the battery module of FIG. 4.

As illustrated in FIG. 7, the battery module 100 according to an exemplary embodiment of the present disclosure may include a cooling member 600 formed between the end plate 400 and the busbar frame 300.

The cooling member 600 according to the present embodiment may provide a cooling path for discharging the heat generated by the busbars 510 and 520 to the outside.

The cooling member 600 may come into contact with the busbars 510 and 520 or the busbar frame 300, and with the end plate 400. The cooling member 600 according to the present embodiment discharges the heat from the busbars 510 and 520 in the direction of the end plate 400, thereby minimizing the ignition phenomenon in the battery module 100.

The cooling member 600 according to the present embodiment may provide a passage for discharging the internal heat of the battery module 100 to the outside. The cooling member 600 absorbs the heat generated around the busbars 510 and 520, and discharges the heat towards the end plate 400, thereby preventing the inside of the battery module 100 from becoming a high-temperature environment. Further, the heat path or cooling path provided by the cooling member 600 may not face an adjacent battery module 100, whereby the phenomenon of heat propagation between the battery modules 100 can be minimized.

The cooling member 600 may be provided with a thermal conductive material capable of dissipating heat generated/transferred between the busbars 510 and 520 or the busbar frame 300 and the end plate 400. For example, the thermal conductive material may be a PVC resin. Further, the cooling member 600 may be provided with an insulating thermal conductive material that interrupts an electrical connection between the busbars 510 and 520 and the end plate 400.

Figure 8:
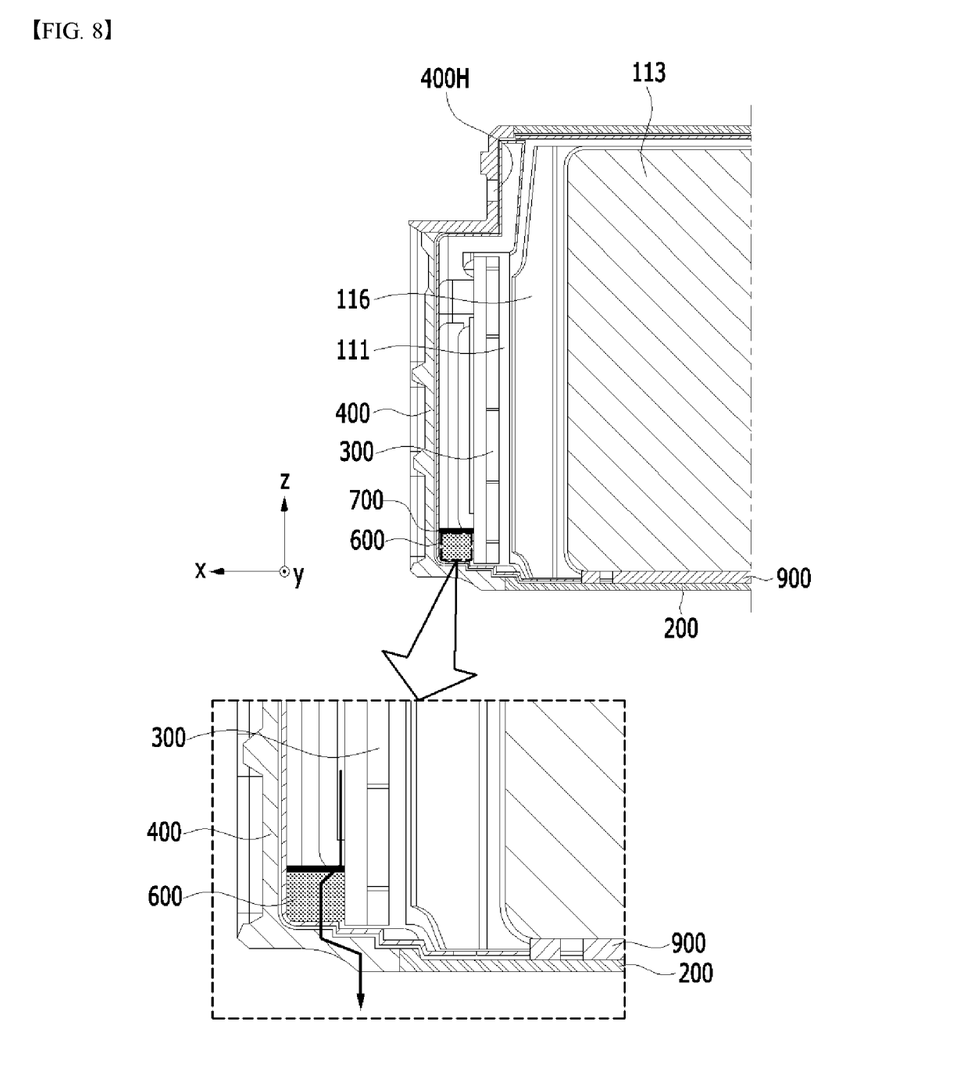
FIG. 8 is another cross-sectional view of the battery module of FIG. 4.

As illustrated in FIGS. 7 and 8, the cooling member 600 may be mainly located close to the bottom part of the housing 200 or the end plate 400, but this is not necessarily so, and the cooling member 600 may be provided to fill a separation space between the end plate 400 and the busbar frame 300 more sufficiently than shown in the figure. Further, the cooling member 600 may be provided to substantially occupy most of the separation space. However, it may be preferable to discharge the internal heat of the battery module 100 toward the lower surface (bottom surface) rather than discharging the internal heat to the front surface or rear surface of the battery module 100. Therefore, the cooling member 600 may be mainly located close to the bottom part of the housing 200 or the end plate 400. This may be because adjacent battery modules 100 are arranged on the front surface or rear surface of the battery module 100.

Moreover, when the thermal conductive resin layer 900 is formed on the bottom part of the housing 200, the heat transferred to the above-mentioned cooling member 600 may be preferably discharged through the thermal conductive resin layer 900. This may be because the thermal conductive resin layer 900 is formed to be wider than the cooling member 600, and thus, the thermal conductive resin layer 900 has a larger heat capacity than the cooling member 600, and has a faster heat transfer rate than the cooling member 600. Therefore, the cooling member 600 can be formed to be connected to the thermal conductive resin layer 900 to effectively discharge heat. Alternatively, even if the cooling member 600 is not directly connected to the thermal conductive resin layer 900, the heat transferred from the busbars 510 and 520 is transferred to the cooling member 600 and the end plate 400, and it may also be possible to sequentially transfer the heat to the housing 200 and/or the thermal conductive resin layer 900.

On the other hand, the cooling member 600 discharges heat around the busbars 510 and 520 or the busbar frame 300 to the side of the end plate 400. If the end plate 400 is a material that is easily deformed by heat or cannot transfer heat, it may be difficult to fully exhibit the effect of the cooling member 600 described above. Therefore, it may be preferable that the end plate 400 of the present disclosure is provided with a material suitable for absorbing heat transferred from the cooling member 600 and discharging it to the outside. For example, the end plate 400 may include aluminum. Specifically, the end plate 400 may be formed of an aluminum alloy material. Here, the thermal conductivity of the aluminum alloy included in the end plate 400 may be 100 w/mk or more, preferably 150 w/mk or more. The material of the end plate 400 may be one whose physical properties are adjusted to effectively absorb the heat transferred from the cooling member 600 and discharge it to the outside. The material involved in the absorption and discharge of heat may be referred to as a thermal conductive material, and is not limited to the material (physical properties) of the cooling member 600. That is, the thermal conductive material is not limited to the PVC resin or the like exemplified above, and it will be apparent that the above-mentioned aluminum alloy may also correspond to a thermal conductive material.

The cooling member 600 may be formed by injecting a resin between the end plate 400 and the busbar frame 300. A space between the end plate 400 and the busbar frame 300 may be filled with the resin. Therefore, the shape of the cooling member 600 may correspond to the end plate 400 and the bus bar frame 300 or the busbars 510 and 520. Specifically, the cooling member 600 may have a shape corresponding to the inner surface of the end plate 400, whereby the cooling member 600 and the end plate 400 can be brought into close contact with each other. Further, the cooling member 600 may have a shape corresponding to the outer surface of the busbar frame 300 or the busbars 510 and 520, whereby the cooling member 600 and the busbar frame 300 or the busbars 510 and 520 can be brought into close contact with each other. The cooling member 600 may more effectively form a cooling path toward the end plate 400 from the busbars 510 and 520 or the busbar frame 300, through contact with the above-mentioned members. Here, the inner surface may be a surface facing the inside of the battery module 100 based on each configuration, and the outer surface may be a surface facing the outside of the battery module 100 based on each configuration.

The resin forming the cooling member 600 may be injected in a state in which the end plate 400 and the busbar frame 300 are combined, and it may be injected/applied before the end plate 400 and the busbar frame 300 are coupled.

When the cooling member 600 is formed by injecting resin in a state in which the end plate 400 and the busbar frame 300 are coupled, an injection hole (not shown) for injecting a resin may be formed in the end plate 400. The filling level of the resin can be checked through the injection hole, and after the resin is injected, the injection hole may be filled with resin or other material.

Here, an insulating cover (not shown) for electrical insulation between the end plate 400 and the electrical equipment mounted on the busbar frame 300 can be provided on the inner surface of the end plate 400. When the insulating cover is provided, the above-mentioned cooling member 600 may be located between the insulating cover and the busbar frame 300. When the injection hole is formed in the end plate 400, the insulating cover may also have an injection hole formed at a position corresponding thereto.

Further, since the material forming the insulating cover may be similar to the material forming the cooling member 600, it would also be possible for the cooling member 600 to replace the insulating cover. Therefore, the insulating cover may not be provided at the position where the cooling member 600 is formed, or the insulating cover and the cooling member 600 may be integrally formed.

Meanwhile, conventionally, a fin or bar-shaped metal member was additionally arranged around the busbars 510 and 520 to form a cooling passage around the busbars 510 and 520. However, in the case of forming a heat transfer passage using a metal member, the added metal member not only increases the overall weight of the battery module 100, but also an additional insulating member such as an insulating cover must be arranged on the outer surface of the metal member, or an insulating coating must be applied to the outer surface of the metal member, which causes a problem of increasing the complexity of the process and assembly of the battery module 100.

Further, when the cooling member 600 is formed via the resin, there is an advantage in that the air layer inside the battery module 100 is removed by sealing between the busbars 510 and 520 or the peripheral portion of the bus bars 510 and 520 and the end plate 400, thereby improving the thermal conductivity. However, when the cooling passage is formed using a metal member, there is a problem that a gap may occur between the metal member and the busbars 510 and 520 or the end plate 400, and the cooling effect is lowered by the air layer formed between them. Therefore, it may be more effective to form the cooling member 600 using a resin having insulation and capable of removing the air layer inside the battery module 100 than forming the cooling passage using a metallic material.

Meanwhile, the cooling member 600 is formed by filling the separation space between the end plate 400 and the busbar frame 300 with resin, and it may be difficult to confirm the coating position of the resin. Therefore, it may be preferable that the space in which the cooling member 600 is formed is specified to prevent the resin from being coated in a position different from that intended by a designer.

FIG. 8 is another cross-sectional view of the battery module of FIG. 4.

As illustrated in FIG. 8, a partition wall 700 for specifying the position of the cooling member 600 may be provided between the end plate 400 and the busbar frame 300.

The partition wall 700 is located between the end plate 400 and the busbar frame 300, and the position of the cooling member 600 may be limited by specifying the filling range of the resin. For example, the partition wall 700 may be provided at a position closer to the lower part than the upper part of the housing 200 or the end plate 400 so that the cooling member 600 is located on the lower part thereof. The position of the partition wall 700 may vary depending on the shape in which the busbars 510 and 520 are mounted on the busbar frame 300 and the shape of the busbars 510 and 520 themselves.

The partition wall 700 may refer to a portion protruding from the end plate 400 or the busbar frame 300. In other words, the partition wall 700 may be integrated with the end plate 400 or the busbar frame 300. When the partition wall 700 is formed on the end plate 400, one end thereof may be designed to abut on the busbar frame 300, and when the partition wall 700 is formed in the busbar frame 300, one end thereof may be designed to abut on the end plate 400.

The partition wall 700 may be formed of the same material as the end plate 400, the busbar frame 300, or the cooling member 600. Specifically, the partition wall 700 is formed of a metal, for example, aluminum, or may be formed of an insulating material such as the bus bar frame 300, or may be formed of a thermal conductive insulator or thermal conductive flame retardant such as a cooling member.

Meanwhile, the partition wall 700 is illustrated in FIG. 8 as being parallel to the lower surface of the battery module 100 or the housing 200, but it is not necessarily so, and it can also be configured to form an angle with the lower surface described above. The shape and position of the partition wall 700 are not limited to those shown in the drawings, and should be interpreted as including all cases provided in various forms and provided in various positions that can serve to limit the position of the cooling member 600.

The above-mentioned battery module can be included in the battery pack. The battery pack may have a structure in which one or more of the battery modules according to the exemplary embodiment of the present disclosure are gathered, and packed together with a battery management system (BMS) and a cooling device that control and manage battery's temperature, voltage, etc.

The above-mentioned battery module and the battery pack including the same can be applied to various devices. Such a device can be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although exemplary embodiments of the present disclosure have been described for illustrative purposes, those skilled in the art will appreciate that various modifications and variations are possible, without departing from the scope and spirit of the disclosure. Therefore, the embodiments disclosed above can be implemented separately or in combination with each other.

The embodiments disclosed above should be considered in a descriptive sense only and not for limiting the technical scope. The technical scope of the present disclosure is not limited by the embodiments, and the spirit and scope of the present disclosure should be interpreted by the appended claims and encompass all equivalents falling within the scope of the appended claims.

The invention claimed is:
1. A battery module comprising:
a battery cell stack comprising a plurality of battery cells that are stacked in a stacking direction,
a housing comprising the battery cell stack,
a busbar connected with an electrode lead of at least one of the plurality of battery cells,
a busbar frame that faces a front surface or a rear surface of the battery cell stack, wherein the busbar frame comprises the busbar mounted on a surface thereof, an end plate coupled with the housing and covering the busbar frame, and a cooling member located in a separation space between the busbar frame and the end plate, wherein the cooling member comprises a thermal conductive resin.

2. The battery module according to claim 1, wherein:
the cooling member is in contact with the busbar and the end plate.

3. The battery module according to claim 1, wherein:
the cooling member is formed long along the stacking direction of the plurality of battery cells.

4. The battery module according to claim 1, wherein:
the cooling member is located closer to a bottom of the housing than to a top of the housing.

5. The battery module according to claim 1, wherein:
the cooling member has an insulating property.

6. The battery module according to claim 1, wherein:
the battery module further comprises a thermal conductive resin layer located on a bottom part of the housing, wherein heat generated from the busbar is transferred to the thermal conductive resin layer.

7. The battery module according to claim 1, wherein:
the end plate comprises a thermal conductive material.

8. The battery module according to claim 1,
further comprising a partition wall located between the end plate and the busbar frame and protruding from the end plate or the busbar frame.

9. The battery module according to claim 8, wherein:
the partition wall is located closer to a bottom of the housing than to a top of the housing.

10. A battery pack comprising the battery module according to claim 1.

* * * * *